June 21, 1932. W. A. GROVER 1,864,431
TRAP FOR CATCHING WILD BEES
Filed Nov. 8, 1930
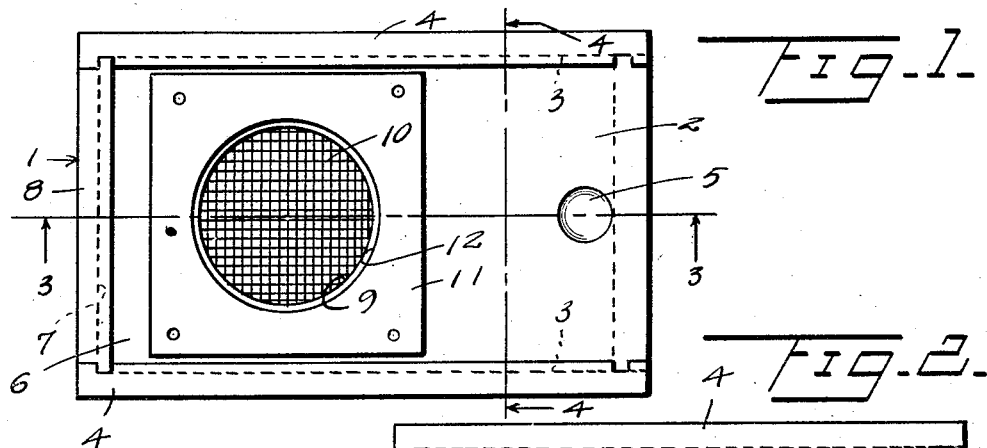
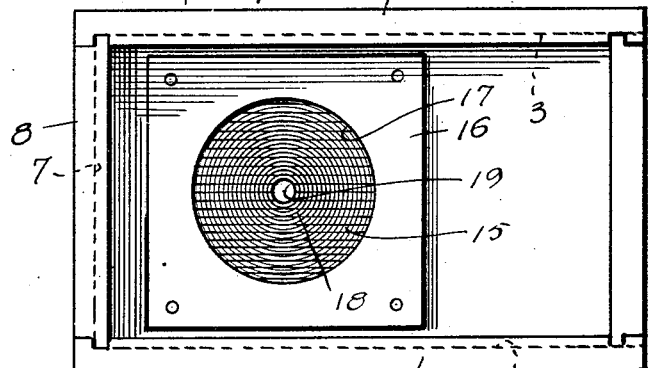
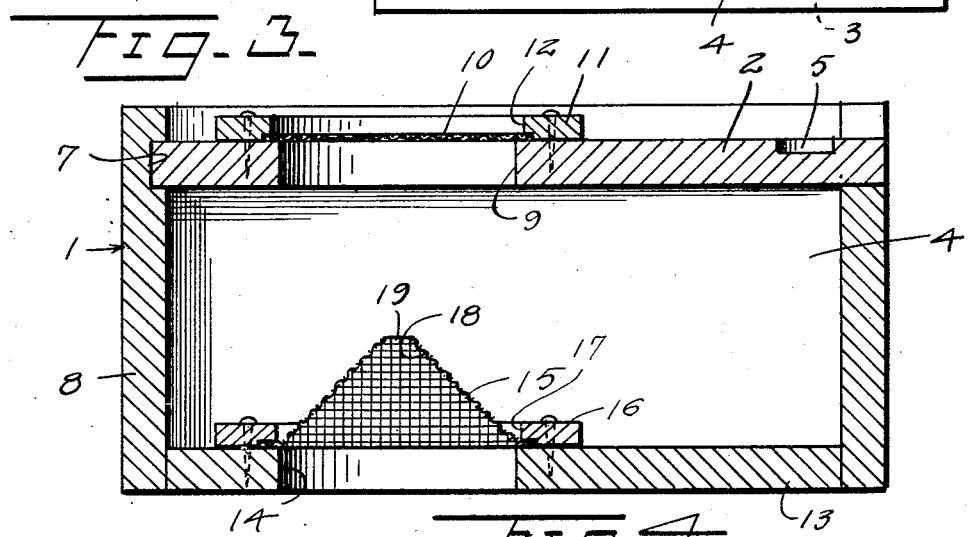
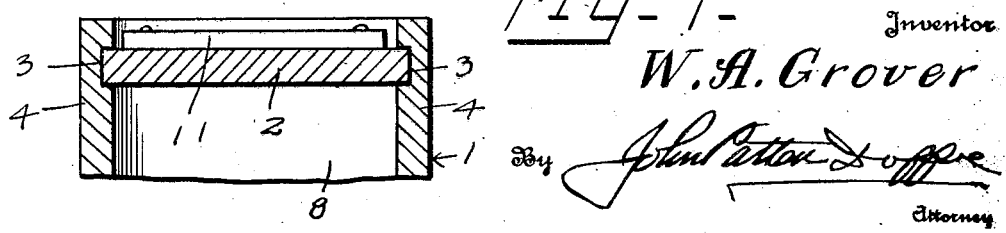
Inventor
W. A. Grover
By *[signature]*
Attorney Patented June 21, 1932

1,864,431

UNITED STATES PATENT OFFICE

WILLIAM A. GROVER, OF BRISTOL, VERMONT

TRAP FOR CATCHING WILD BEES

Application filed November 8, 1930. Serial No. 494,430.

This invention relates to new and useful improvements in traps for catching wild bees.

One object of my invention is to provide a trap of this character in the form of an oblong wooden box with an ingress opening and a removable cover, whereby several bees may be caught at the same time without liberating any of the bees.

A further object of my invention is to provide a trap for catching wild bees which is simple, compact and economical in construction and highly efficient and durable in use.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a top plan view of a trap for catching wild bees, embodying my improvements.

Figure 2 is a similar view, the cover removed.

Figure 3 is a side elevation view.

Figure 4 is a central vertical longitudinal section, taken on line 4—4 of Figure 1.

Referring to the drawing for a more particular description of my invention and in which drawing like parts are designated by like reference characters throughout the several views, my device is preferably in the form of a rectangular wooden box 1, of suitable dimensions, provided with a sliding cover 2, which works in the longitudinal grooves 3 in the inner faces of the side walls 4 of said box. The outer end of the sliding cover may be formed with a central recess 5, adapted to be engaged by the thumb or finger for convenience in opening or closing the same and the opposite or inner end 6 of the cover fits in a corresponding transverse groove or mortise 7 in the adjacent end wall 8 of the box when the cover is closed, thus insuring a perfectly tight fit.

In carrying out my invention, the inner end 6 of the cover is provided with a circular opening 9 which is covered by a flat wire screen 10, fastened in place by the square panel 11, formed with a central opening 12, approximately corresponding in size to the opening 9. The bottom 13 of the box is also provided with a circular opening 14, corresponding in size with the opening 9 and disposed directly opposite or in registration therewith.

A cone-shaped wire screen 15 is arranged on the inside of the box over the opening 14 and is fastened in place at its base by the square wooden panel 16, formed with a central opening 17, corresponding in size with the opening 14. The upper or apex end 18 of the cone-shaped wire screen 15 is formed with an ingress opening 19, the purpose of which will presently appear.

My improved bee trap is used as follows: A piece of honey comb is first placed in the box and when a wild bee is found on a flower, the cone-shaped wire screen 15 is placed over the bee. The bee will crawl by instinct towards the light through the ingress opening 19 of the cone-shaped wire screen into the box and once in the box cannot escape until liberated. After the bee is captured, the box is darkened and the bee allowed to feed on the honey. After a time, the sliding cover is opened and the bee allowed to escape. The bee will then return to its swarm and later bring other bees to the box to feed. In this way, it can be ascertained in which direction the bees fly to return to the swarm and the trap can be continually moved in this direction until the bee tree is found.

From the foregoing description taken in connection with the drawing, it is thought that the construction, operation and advantages of my invention will be readily understood without requiring a more extended explanation.

Having described my invention, what I claim as new and desire to secure by Letters Patent is:

A trap for catching wild bees, comprising an oblong box provided in its bottom with an opening, a cone-shaped wire screen arranged within the box over said opening, said screen formed in its apex or upper end with an ingress opening, a panel for fastening the base of the wire screen to the bottom of the box, a sliding cover for the box, provided in one end with an opening, a wire screen covering the opening in the sliding cover and a panel for fastening said last mentioned wire screen in place.

In testimony whereof he affixes his signature.

WILLIAM A. GROVER.